United States Patent
Mischel, Jr. et al.

(10) Patent No.: US 8,880,360 B2
(45) Date of Patent: *Nov. 4, 2014

(54) MIRROR WITH MEDIA DISPLAY DEVICE

(75) Inventors: James V. Mischel, Jr., Seattle, WA (US); James V. Mischel, Sr., Lynnwood, WA (US)

(73) Assignee: Electric Mirror, LLC, Everett, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/374,430

(22) Filed: Dec. 28, 2011

(65) Prior Publication Data

US 2012/0293723 A1 Nov. 22, 2012

Related U.S. Application Data

(63) Continuation of application No. 11/563,119, filed on Nov. 24, 2006, now Pat. No. 8,099,247.

(60) Provisional application No. 60/794,209, filed on Apr. 21, 2006, provisional application No. 60/739,399, filed on Nov. 23, 2005, provisional application No. 60/739,156, filed on Nov. 23, 2005.

(51) Int. Cl.
*H04N 5/66* (2006.01)
*A47G 1/02* (2006.01)
*G09F 9/00* (2006.01)
*G09F 13/12* (2006.01)
*G09F 19/14* (2006.01)

(52) U.S. Cl.
CPC .. *A47G 1/02* (2013.01); *G09F 9/00* (2013.01); *G09F 13/12* (2013.01); *G09F 19/14* (2013.01)
USPC ............. 702/44; 348/795; 348/744; 348/791; 348/E9.027; 348/739; 362/2; 362/141; 362/611; 362/492; 362/245; 362/135; 362/129; 362/308; 359/839

(58) Field of Classification Search
CPC ........... A47G 1/02; G09F 19/14; G09F 13/12; G09F 9/00
USPC ............. 702/44; 359/460.839, 871, 609, 849, 359/443; 362/611, 2, 141, 308, 245, 135, 362/129; 348/795, 744, 791, E9.027
See application file for complete search history.

(56) References Cited

U.S. PATENT DOCUMENTS

| | | | | |
|---|---|---|---|---|
| 4,733,229 A * | 3/1988 | Whitehead | ...................... | 345/20 |
| 5,592,240 A * | 1/1997 | Sakamoto et al. | ............ | 348/807 |
| 6,567,060 B1 * | 5/2003 | Sekiguchi | ........................ | 345/87 |
| 6,709,114 B1 * | 3/2004 | Duggan et al. | .................. | 353/74 |
| 6,833,880 B1 * | 12/2004 | Chen | ............................. | 348/787 |
| 6,921,174 B1 * | 7/2005 | Duggan et al. | .................. | 353/74 |
| 7,012,727 B2 * | 3/2006 | Hutzel et al. | .................. | 359/265 |
| 7,287,737 B2 * | 10/2007 | Rossi | ........................ | 248/475.1 |
| 7,551,354 B2 * | 6/2009 | Horsten et al. | ........... | 359/485.07 |
| 2002/0015226 A1 * | 2/2002 | Rottcher | ....................... | 359/443 |
| 2005/0168813 A1 * | 8/2005 | Benning et al. | ............... | 359/443 |
| 2006/0150462 A1 * | 7/2006 | Rossi | ............................. | 40/700 |
| 2007/0046841 A1 * | 3/2007 | Jacobsmeyer et al. | ........ | 348/836 |
| 2007/0159316 A1 * | 7/2007 | Mischel et al. | ............... | 340/461 |
| 2007/0201132 A1 * | 8/2007 | Cannon et al. | ................ | 359/460 |

* cited by examiner

*Primary Examiner* — Carol S Tsai
(74) *Attorney, Agent, or Firm* — Peloquin, PLLC; Mark S. Peloquin, Esq.

(57) ABSTRACT

A combination mirror and media display device assembly is provided. The combination mirror and media display device includes a mirror platform having a media display device viewing area and a media display device coupled to the mirror platform. The media display device is positioned to display images through the media display device viewing area.

12 Claims, 10 Drawing Sheets

MIRROR WITH MEDIA DISPLAY DEVICE

CROSS-REFERENCE TO RELATED APPLICATIONS

This application is a continuation of U.S. patent application Ser. No. 11/563,119, filed on Nov. 24, 2006, which claims the benefit of U.S. Provisional Application No. 60/794209, filed Apr. 21, 2006; U.S. Provisional Application No. 60/739399, filed Nov. 23, 2005; and U.S. Provisional Application No. 60/739156, filed Nov. 23, 2005, the disclosures of which are all expressly incorporated herein by reference.

BACKGROUND OF THE INVENTION

Currently available mirror and television devices typically include a television mounted to the back of a mirror. This arrangement is a convenient space saving device as it embeds a television in the existing space occupied by a mirror. Although available, these devices typically suffer from either poor transmissivity or reflectivity.

The transmissivity and reflectivity of a mirror are roughly inversely related. That is, a mirror with high transmissivity generally has low reflectivity, and a mirror with high reflectivity generally has low transmissivity. As a result, a mirror with high transmissivity will allow more light from a television located behind the mirror to pass through the mirror, resulting in better viewing of the image displayed on the television. However, such a mirror will also have a relatively low reflectivity, resulting in a lower quality reflection in the mirror.

In addition to the presenting the difficulty of balancing television image quality with the reflection quality, current mirror/television combinations do not provide additional sources of illumination, such as back lighting. This results in the need for separate light fixtures in addition to the mirror/television combination, which can cause additional installation costs and unsightly clutter.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A combination mirror and media display device assembly is provided. The combination mirror and media display device includes a mirror platform having a media display device viewing area and a media display device coupled to the mirror platform. The media display device is positioned to display images through the media display device viewing area.

BRIEF DESCRIPTION OF THE DRAWINGS

The foregoing aspects and many of the attendant advantages of this invention will become better understood by reference to the following detailed description, when taken in conjunction with the accompanying drawings, wherein.

APPENDIX

Mirror with TV

Field of the Invention

Figure 1:
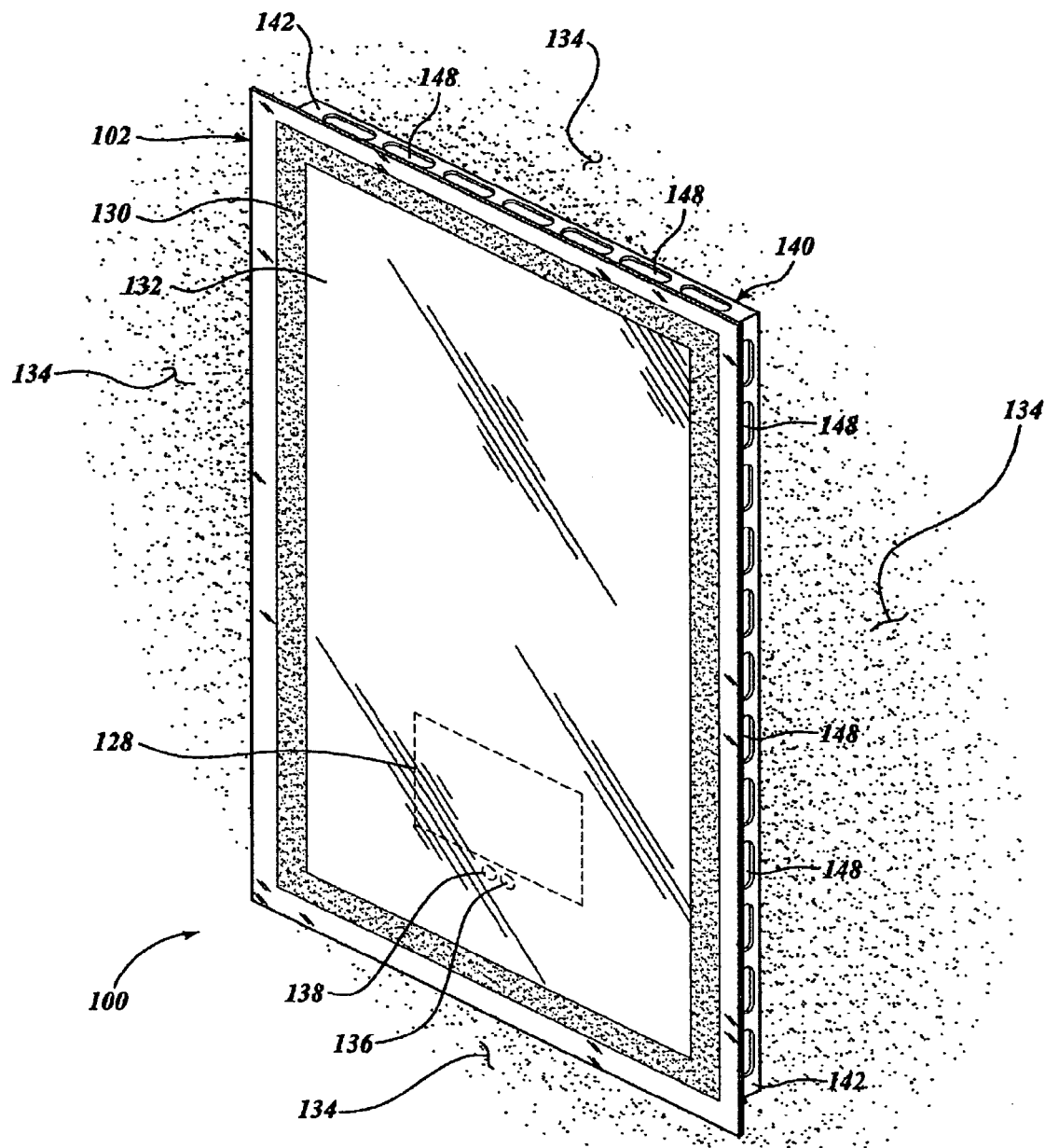
FIG. 1 is an isometric view of a representative mirror/media display device assembly constructed in accordance with one embodiment of the present disclosure.

The present invention relates to a mirror with a TV.

SUMMARY OF THE INVENTION

The present invention provides a mirror with a TV. The mirror comprises an assembly that includes a TV attached to a mirror via a TV mounting bracket.

The mirror includes three options that allow for images to pass through the mirror face. The first option is the mirror with one or more portions having no reflectivity allowing images to pass through the mirror face. The second option is a partially reflecting mirror also known as a transparent mirror. The third option is the mirror with one or more non-reflecting portions with a polarized reflective film placed between the no reflecting area and the TV screen.

The first mirror option also includes additional areas of no reflectivity, enabling an infrared signal to pass though the glass and thereby reach a sensor to control the TV. This area is suitably placed below the area of no reflectivity for the TV. It allows for ease of use when a user directs an infra red signal in the direction of the TV. The first mirror option also includes an area of no reflectivity enabling an indicator light to pass through the glass. The indicator light indicates to the user when the TV is on or off. Many TVs have a delay prior to coming on. The indicator light comes on more quickly than the TV screen and thereby enables the user to identify if the TV is operational.

The second option, of a partially reflective mirror, may include a high reflective coating, glass or film placed on the back side of the mirror except where the TV is located. Transparent mirrors are not as reflective as standard mirrors. The reflective film enhances the reflectivity of the mirror everywhere except where the TV is located, thereby providing overall good reflection while still allowing the TV to project images through the glass without reducing light output. With this mirror option when the TV is in the off position it produces no light and therefore disappears into the mirror.

The third option uses a polarized film that when oriented with the polarization of the TV screen allows approximately 100% of the outputted light to pass through the film and glass. The film is reflective when the TV is in the off position. The TV therefore disappears into the mirror.

The TV is a thin, 1" profile design, allowing it to fit between the mirror and wall. Notably the TV has a built in power adapter that fits within the 1" TV housing. Typical TV units that are less than 2" in thickness have external TV adapters that are large in size and take up space. This requires a wall recess behind the mirror to accommodate the power adapter. The built in adapter is an advantage over the prior art because it eliminates the need for the cost associated with building a wall recess to accommodate the power adapter and TV.

The TV also includes an indicator light and infra red sensor. Both of which are enclosed in the TV housing. The indicator light and infrared sensor is built on the face of the TV housing to allow for proper placement when the TV is against the glass. The infra red sensor and indicator light line up with the area of no reflectivity on the mirror. This allows for exact placement of the TV on the glass. The TV further includes screws holes along its sides allowing for attachment to a TV mounting bracket that is attached to the glass surface. Of particular note is the brightness of the TV when being used with the transparent mirror. A transparent mirror blocks a significant amount of light. A high bright TV, in the category of 500-2000 nits of brightness when used in combination with a transparent mirror produces a much better image for viewing. The TV also includes built in amplifiers, left and right and line level audio output.

The TV is attached to the mirror with a mounting bracket. The mounting bracket is shaped to receive the TV. The mounting bracket has holes on its sides to hold the TV to the mounting bracket. The mounting bracket is open on one side, typically the top or bottom as to not interfere with the TV's connections. The mounting bracket may come with magnets allowing the TV to be held into place without screws. In some circumstances where the mirror cannot be easily removed, an access area may be provided below the mirror. This allows a user to reach up behind the mirror and easily slide the TV down to remove for repair. In a like manner the TV may be easily replaced by sliding it upward into the mounting bracket with the magnets holding it into place. The mounting bracket is attached to the mirror surface using high bond double sided tape. The mounting bracket may also come with a back side flange or flanges to hold the TV into place without magnets or screws.

The TV may be operated with an infra red remote or wall mounted infra red emitter. The remote or infra red emitter may have limited functionality such as volume, channel, and power control only. The advantage of this limited functionality is to not confuse the user.

The complete-assembly, mirror with the TV, mounts to the wall with mirror mounting brackets. The mirror mounting brackets include a top mounting bracket and two bottom mounting brackets. The top mounting and bottom mounting brackets are attached to the back of the mirror. The brackets may be attached using a high strength epoxy or similar product. The top mounting bracket attaches to a corresponding wall bracket. The wall bracket is attached to the wall. The bottom mounting bracket is designed to accept a T shaped screw that screws into the wall. The T shaped screw is used in conjunction with the bottom mounting bracket as a security device to hold the mirror to the wall.

The above mentioned mirrors may be framed or frameless. In a situation where the mirror has a framed edge around it, alternative methods of attaching the mirror to the wall may be used. In some cases it may be beneficial to attach a mounting bracket to the frame holding the mirror. In these cases similar mounting brackets may be used. The advantage of the overall design is that a framed mirror with the TV may be attached to the wall using mounting brackets without having to make any wall recesses to accommodate an adapter or thick TV.

Further features of the invention include the following: 1) mounting a digital clock or other digital devices to the back of the mirror similarly to the method described above. 2) Attaching an acoustic driver or drivers to the back surface of the mirror thereby vibrating the glass and creating sound. The mounting brackets described above are of sufficient size to enable the acoustic drivers to attach to the back surface of the mirror Without interfering with the wall. The mirror is attached to the frame or mounting brackets in such a way as to provide sufficient vibration to allow the glass to become a speaker. 3) Combining the mirror and TV with cameras mounted to the front, back and side of the user. The video cameras feed images to the TV or multiple TVs in the mirror thereby allowing the user to see front, back and side profiles of themselves. The camera may be hidden behind the mirror using techniques as described above such as reflective polarized film, transparent mirror, or no reflectivity areas. A single TV may be used with multiple camera angles whereby the user toggles through channels to see herself/himself at multiple angles. The product has advantages for users that would like to see what they look like at multiple angles. 4) The mirror with TV may be used with a recessed clock receptacle. The recessed clock receptacle enables the power cord of the TV to be plugged into a receptacle behind the mirror without sticking out beyond ½" and interfering with the mirror. One advantage is that a wall recess does not need to be created to accommodate a plug and receptacle as a power cord plugging into a typical receptacle would stick out much too far and interfere with mirror. 5) Between the mirror and TV may be placed a gasket tape that is used to seal out dust and still allow for the flow of air. It is important to not trap air between the TV screen and glass face as it may cause moisture condensation on the glass and interfere with the viewing experience. 6) The process of removing the reflective area from the mirror is part of the invention. This is accomplished by isolating the desired area to be removed on the back side of the mirror. This area may be isolated by applying tape, printed ink or similar item to the back of the glass surface around the area to be made non reflective. Once this is done, paint remover is applied to the back of the mirror surface. Next the paint is removed with a scraping type device such as a razor blade. It is then washed with water thereby removing the paint and exposing the reflective metal of the mirror. A sharp instrument is used to remove paint and define the outer perimeter of the non reflective surface. Ferric chloride (FeCl3), printed circuit board etched solution or similar product is applied to the exposed reflective metal area of the mirror. The solution sits for a period of time and then is wiped away taking with it the reflective metal surface of the mirror with only the glass remaining. Water or glass cleaner may be applied to clean the area. A paper cover may be applied to keep the area free of dust and other particles. A metal or plastic template may be used to accurately define the outer margins and infrared and indicator light areas. 7) The TV components may be sealed to protect against moisture. They are also arranged in such a way as to provide for the thinnest TV design and in such a manner as to make them easy to install. The TV housing which may be made out of metal, plastic or other material is designed with counter sunk areas so as to not expose any screws heads beyond the surface of the TV housing thus eliminating any areas that could scratch the glass. 8) The TV screen may be used for TV signals, computer signals, VGA connections and the like. It is not limited to TV viewing. 9) The TV may be a LCD, plasma, OLED, LED or other similar display device. 10) The mirror is a sufficient distance off the wall to enable a four port wall plate, or similar wall place used for audio and video connections, to be placed behind the mirror without interfering with the connections.

DETAILED DESCRIPTION

A mirror/media display device assembly 100 constructed in accordance with one embodiment of the present disclosure may be best understood by referring to FIGS. 1-4. The mirror/media display device assembly 100 includes a framed or frameless mirror platform 102 attached to a chassis 140. The mirror platform 102 includes a substantially reflective surface 132, one or more translucent back lit portions 130, and a media display device viewing portion 128, through which a media display device 120 located behind the mirror platform 102 can be viewed. The chassis 140 includes edge sections 142 arranged to form a perimeter (i.e., periphery) of the chassis 140. The edge sections 142 include one or more apertures 148. Although the chassis 140 is described as including apertures 148, it should be apparent that chassis 140 without apertures 148 are also within the scope of the present disclosure. Light emanating from the assembly 100 is illustrated schematically by reference numeral 134.

The one or more back lit portions 130 located on the mirror platform 102 have substantially no reflectivity (e.g., frosted glass, acid etched glass or clear glass). These back lit portions 130 are translucent, allowing light emitted from one or more light sources 122 disposed within the mirror/media display device assembly 100 to pass through the mirror platform 102. The number, configuration, and arrangement of back lit portions 130 can be varied to achieve different lighting effects. As a non-limiting example, the back lit portion 130 is configured as a single, continuous portion extending around the perimeter of the mirror platform 102.

Light radiated from the light source 122 radiates through the plurality of apertures 148 to illuminate the surroundings of the mirror/media display device assembly 100. Illuminating the surroundings, such as the wall on which the mirror/media display device assembly 100 is mounted, creates a back lighting effect. The number and location of the apertures can be varied to achieve the desired visual atmosphere. For example, each side of the chassis includes a single aperture that extends along the length of the side of the chassis. In another embodiment, the chassis includes a single aperture that extends along the length of the lower edge of the chassis, illuminating a sink or countertop above which the mirror/media display device assembly 100 is mounted.

The apertures 148 of the chassis 140 can be optionally covered by a transparent or translucent material (e.g., a plastic strip). In addition to helping to prevent dirt and moisture from entering the mirror/media display device assembly 100, the material can be colored so that light radiated through the apertures 148 creates a desired visual effect.

In another embodiment, back lighting is provided by radiating light through the back lit portions 130 of the mirror platform 102. As noted above, the back lit portions 130 include translucent areas having substantially no reflectivity or could be partially reflective. The low reflectivity allows light from the light source 122 to pass through the mirror, illuminating the back lit portions 130 of the mirror platform 102. The number and shape of the back lit portions 130 can be varied to provide desired visual effects.

The media display device 120 is mounted within the mirror/media display device assembly 100 so that the screen of the media display device 120 aligns with the media display device viewing area 128 of the mirror platform 102. The term "media display device" should be understood to include any media display device suitable for receiving television signals, computer signals, VGA connections, digital signals, etc., and displaying a corresponding image.

The media display device 120 includes a well-known indicator light 136 and infrared sensor 138. The indicator light 136 provides a signal indicating whether the media display device is "powered on" or "powered off." The infrared sensor 138 provides a remote communication port with the media display device 120. The indicator light 136 and infrared sensor 138 are suitably located on a forward face of the media display device housing.

When the media display device is installed, the infrared sensor 138 and indicator light 136 each aligns with a part the mirror platform 102 having little or no reflectivity. The reduced reflectivity makes the indicator light more readily visible from the front side of the mirror platform 102 and also allows the infrared signal from a remote control to pass through the mirror platform 102.

In one embodiment, the media display device 120 is attached to the mirror/media display device assembly 100 by a suitably shaped and configured mounting bracket (not shown). The media display device 120 can be attached to the mounting bracket with removable fasteners, such as screws and magnets. The mounting bracket is open on one side, typically the top or bottom so that it does not interfere with audio/video connections of the media display device 120. One version of the mounting bracket allows the media display device 120 to slide in from the bottom and snap into place without being mechanically fastened.

For circumstances in which the mirror/media display device assembly 100 cannot be easily removed from a wall, an access area (not shown) can be provided through the bottom of the chassis 140. The access area allows a user to reach up behind the mirror platform 102 and remove the media display device 120 for repair or replacement. In a like manner, the media display device 120 can be easily remounted through the access area.

Figure 2:
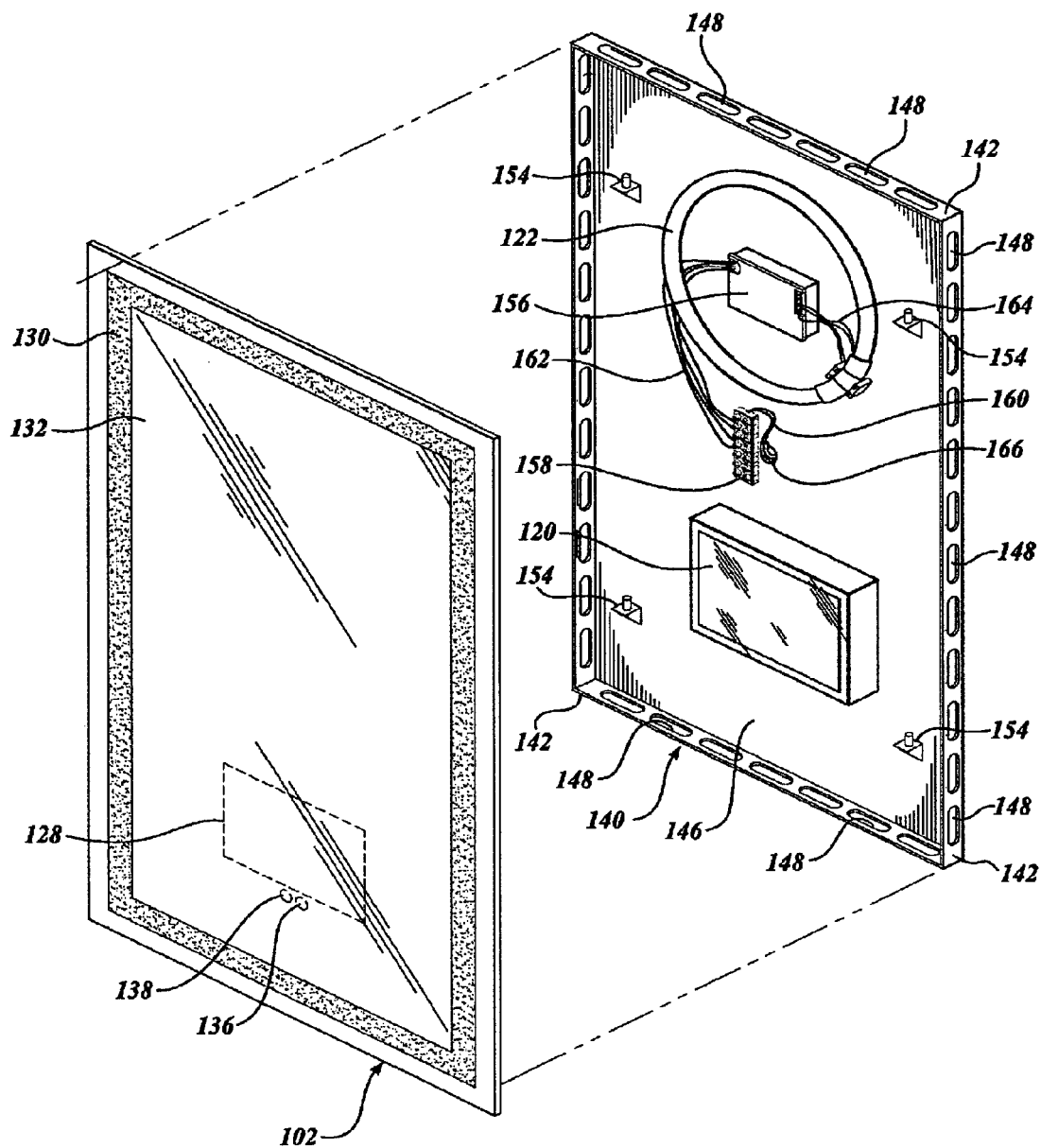
FIG. 2 is an exploded front isometric view of the mirror/media display device assembly of FIG. 1.

Referring to FIG. 2, the chassis 140 includes a central opening 166 sized for a direct connection of an external electrical cable 160 to a terminal block 158 which, in turn, is in electrical communication with an electrical ballast 156. The connection at the terminal block 158 is covered with a metal box to provide an isolated electrical connection and thereby eliminate the need for an external electrical box. A further opening or openings are provided to accommodate a power receptacle and audio and video connections. As an alternative electrical connection the lighting components could be plugged into a receptacle. The chassis 140 is suitably manufactured from a variety of materials including, metal, wood, fiberglass, and various polymers. Polymers and other materials can optionally be transparent or translucent.

Figure 3:
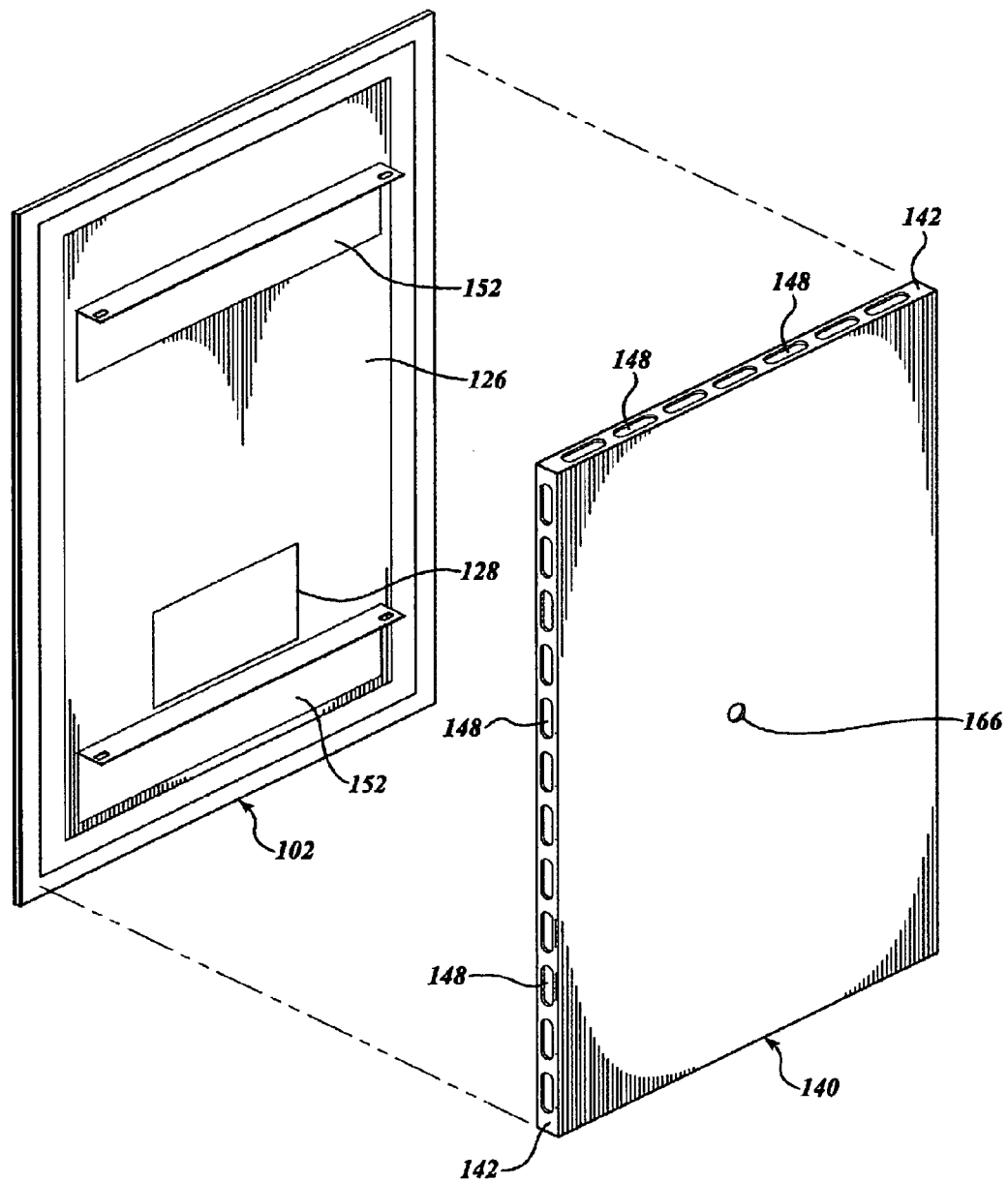
FIG. 3 is an exploded rear isometric view of the mirror/media display device assembly of FIG. 1.

As best seen in FIG. 3, the mirror platform 102 includes a rear surface 126 having flanges 152. The flanges 152 include slots for receiving hanging pins 154, which are attached to a the back surface 146 of the chassis 140 (see FIG. 2), to removably couple the mirror platform to the chassis 140. It should be appreciated that the mirror platform can be coupled to the chassis through any of a variety of suitable methods, including temporary fasteners, permanent fasteners, adhesives, etc.

Figure 4:
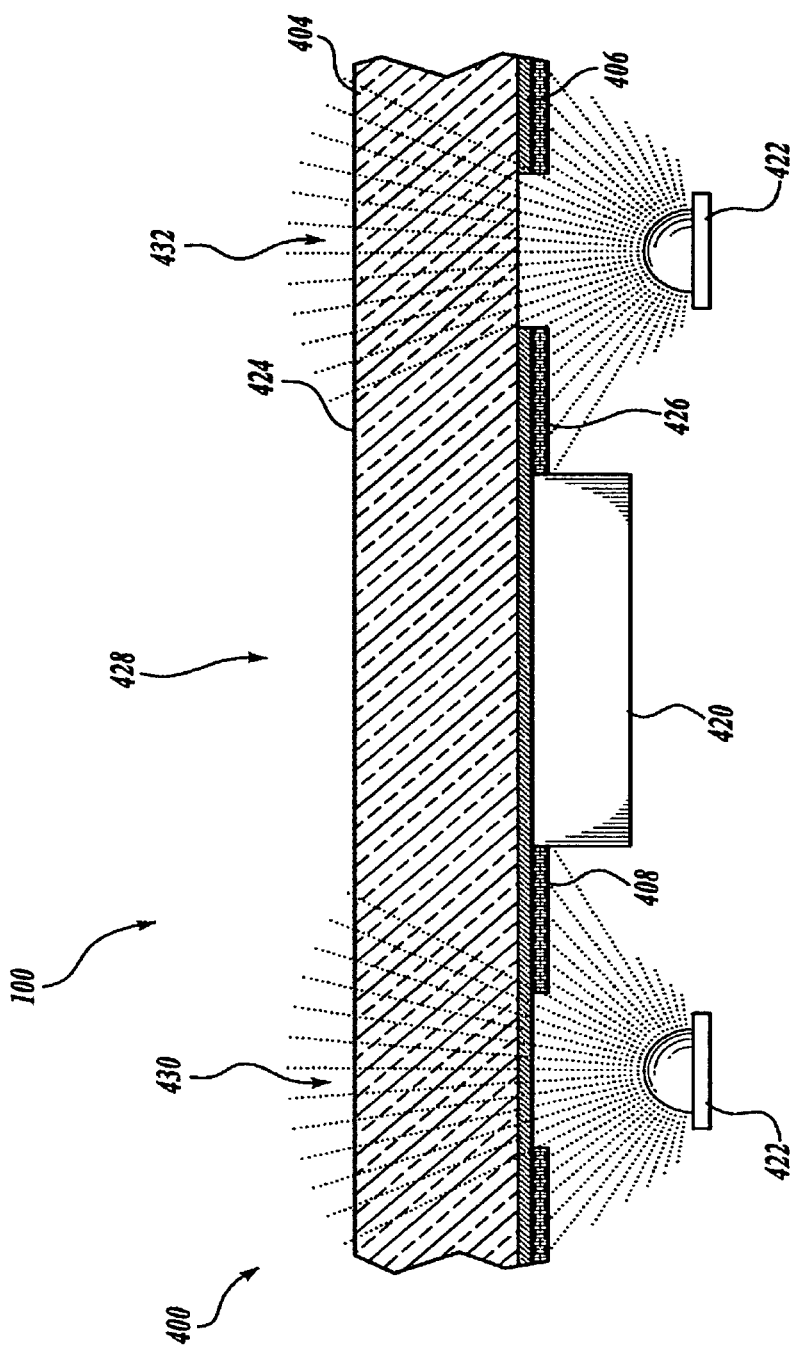
FIG. 4 is a cross-sectional view of the mirror/media display device assembly of FIG. 1 constructed in accordance with a first embodiment of the present disclosure.

FIG. 4 illustrates a mirror/media display device assembly 100 having a mirror platform 400 constructed in accordance with one embodiment of the present disclosure. The mirror platform 400 includes a glass layer 404, a reflective layer 406, and backing layer 408. For ease of description and clarity, such a mirror platform 400 is referred to as a "transmissive mirror."

The transmissive mirror includes a front surface 424 and a rear surface 426. The reflective layer 406 provides a partial reflectivity to the transmissive mirror and is suitably formed by a reflective film, a sputter coating, or any other type of suitable reflective material. The reflective layer 406 is both reflective and transmissive. While the reflective layer 406 is shown on the rear surface 426 of the transmissive mirror, it can also be located on the front surface 424 or both the front and rear surfaces 424 and 426 of the transmissive mirror. The transmissive mirror is partially transmissive, preferably having a transmissivity of about 50%, although mirrors having transmissivity between about 30% and about 70% are within the scope of this embodiment.

Still referring to FIG. 4, the backing layer 408 is selectively disposed on the rear surface 426 of the transmissive mirror. The backing layer 408 increases the reflectivity of the mirror platform 400 in areas to which it is applied. Because of the increased reflectivity, these areas provide a better reflection, which is closer to that of a standard mirror, than do the portions of the transmissive mirror to which the reflective backing is not applied.

The backing layer 408 is not applied to the transmissive mirror in the media display device viewing area 428. As a result, while the media display device viewing area 428 has some reflectivity due to the reflectivity of the transmissive mirror, the media display device viewing area 428 has less reflectivity than the areas of the transmissive mirror to which the backing layer 408 has been applied. The reduced reflectivity in the media display device viewing area 428 causes less glare and consequently results in a clearer view of the images displayed on the media display device.

It should be appreciated, however, that when the media display device 420 is turned off, the substantially black media display device screen located behind the media display device viewing area 428 will change the light ratio between the front and back of the mirror; thereby, allowing transmissive mirror to operate at its maximum reflectivity. Accordingly, the reflection from the media display device viewing area 428 will more closely match that of the rest of the transmissive mirror, causing the media display device viewing area 428 to blend in with the rest of the transmissive mirror.

The backing layer 408 is suitably formed from a reflective film, sputter coating, silvering, or any other material that enhances reflectivity when applied to a surface 426. Depending on the material used, a variety of suitable techniques can be used to selectively apply the reflective backing, including masking areas in which the reflective backing is not to be applied, using computer controlled applicators, or applying the backing to the entire transmissive mirror and then selectively removing it.

The transmissive mirror also includes first and second back lit portions 430 and 432. The back lit portions 430 and 432 are suitably formed on the transmissive mirror by different methods. As previously described, the back lit portions are at least partially translucent, having lower reflectivity and/or higher transmissivity than the rest of the transmissive mirror. Accordingly, back lit portions 430, 432 can be formed by decreasing the reflectivity of the back lit portion relative to the rest of the transmissive mirror.

A first back lit portion 430 formed on the mirror platform 400 is similar in construction to the media display device viewing area 428. The first back lit portion 430 is defined by an area where the backing layer 408 is not present. As previously discussed with regard to the media display device viewing area, the first back lit portion 430 can be formed by the selective application of the backing layer 408, during which the backing layer 408 is not applied to the first back lit portion, or the selective removal of the reflective backing after it has been applied to the first back lit portion. The backing layer 408 may be removed from the first back lit portion by any suitable method, including acid etching, and an acid dip prior to which areas of the reflective backing that are to remain are masked. A film simulating a "frosted" effect may be placed on the backside of reflective layer 406.

When light from a light source 422 is irradiated on the rear surface of the mirror platform 400, the portions of the transmissive mirror to which the backing layer 408 has been applied to reflect the light back from the rear surface 426 of the transmissive mirror and consequently, substantially none of the light passes through the transmissive mirror to illuminate the front surface 424 mirror platform 400. In contrast, when light from the light source 422 strikes a portion of the transmissive mirror without backing layer 408, at least part of the light travels through the transmissive mirror, thereby illuminating the back lit portion 430 of the mirror platform 400. When the light source 422 is in an "off" state, the back lit portion 430 reverts back to having the reflectivity of a standard mirror.

A second back lit portion 432 is provided on the mirror platform 400. The second back lit portion 432 is similar to the first back lit portion 430 except that, in addition to the backing layer 408, some or all of the reflective layer 406 of the transmissive mirror is also removed in the area of the second back lit portion 432. Consequently, when light from the light source 422 is irradiated onto the rear surface 426 of the mirror platform 400 at a second back lit portion 432, at least some of the light is transmitted through the transmissive mirror to illuminate the front surface of the mirror platform 400 at the second back lit portion 432.

Further, because at least some of the reflective layer 406 of the transmissive mirror has been removed, a greater percentage of light from the light source 422 will pass through the second back lit portion 432 than will pass through the first back lit portion 430. It should be appreciated that any suitable number of back lit portions, such as three, four, five, six, etc., can be formed on the platform assembly 400 and, therefore, are also within the scope of the present disclosure.

The reflective layer 406 and the backing layer 408 may be removed from the second back lit portion by any suitable method, including sand blasting, acid etching, and an acid dip. Areas of the reflective layer 406 and backing layer 408 that are to remain are masked prior to removal treatment. Sandblasting, is particularly effective for providing a "frosted" effect in the back lit portion 432. A protective coating may be applied to the sand blasted areas of the glass to allow the sand blasted areas to be more easily cleaned and prohibit staining from finger prints, dirt, etc. This could occur for sand blasting on the front or back surface of the mirror.

In addition, the resist used to mask off the mirror for sandblasting may also be used as a safety back material. Typically, the resist is removed from the mirror after it has been sand blasted. In this case the resist would be left on and act as a safety backing. The resist may be laid on the back of the mirror and cut by a laser or other method or may be plotted and then placed on the back of the mirror.

Areas of the backing layer 408 and/or the reflective layer 406 of the transmissive mirror can also be selectively removed to provide areas of lower reflectivity to accommodate an indicator light 136 or an infrared sensor 138 (see FIG. 1).

Figure 5:
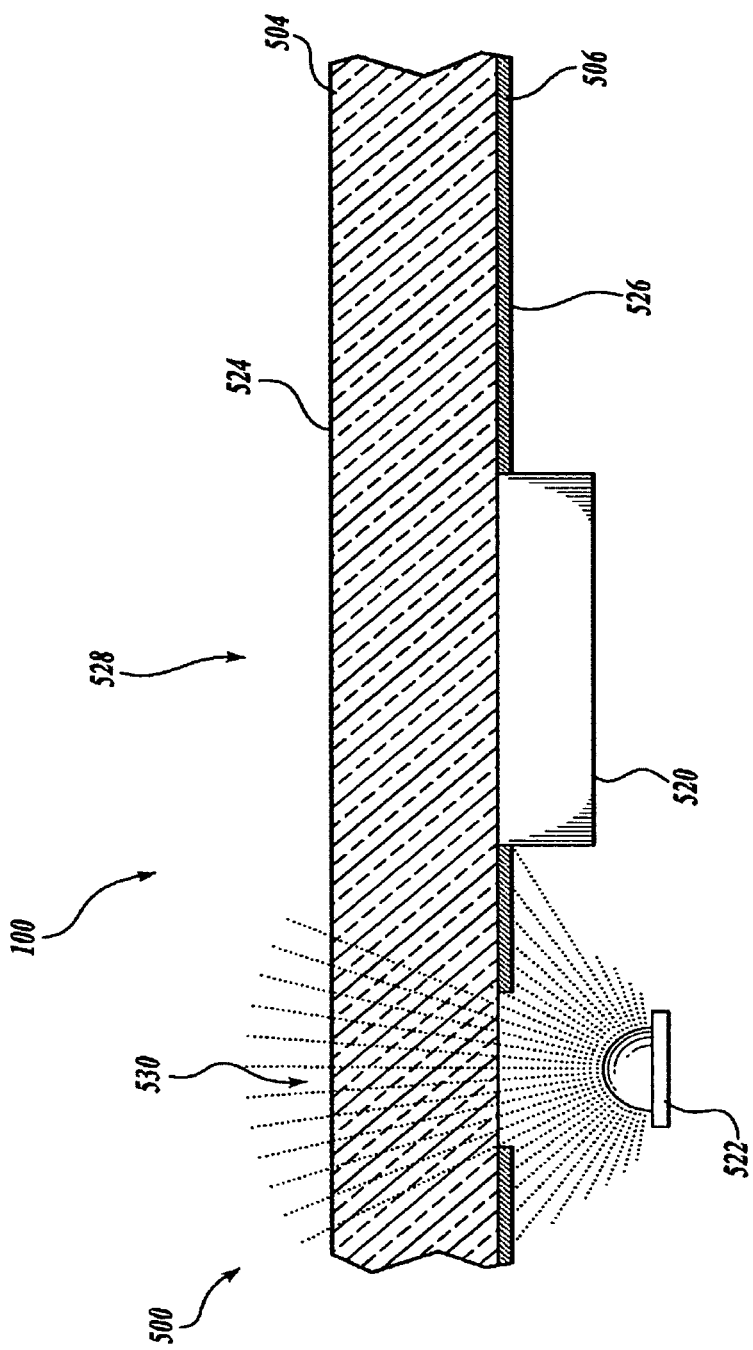
FIG. 5 is a cross-sectional view of a mirror/media display device assembly constructed in accordance with a second embodiment of the present disclosure.

FIG. 5 illustrates a mirror/media display device assembly 100 having a mirror platform 500 constructed in accordance with a second embodiment of the present disclosure. The mirror platform 500 is substantially identical in construction, material and operation as the mirror platform 400 described above with the following exceptions.

The mirror platform 500 includes a glass layer 504 and a backing layer 506, and also includes a front surface 524 and a rear surface 526. The rear surface 526 of the backing layer 506 is typically painted with a protective paint. For ease of description and clarity, the mirror platform 500 is referred to as a "standard mirror."

The standard mirror provides substantially no transmissivity, while reflecting almost all incident light. Commercially available standard mirrors, which are suitable for use with this embodiment, typically have a reflectivity of about 98%, which provides a very good reflection in the mirror portion of the mirror platform 500. However, it should be appreciated that a mirror having a lower reflectivity than a standard mirror can be used within the scope of this embodiment. Further, while a standard mirror usually has a backing layer 506 located on the rear surface 526 of the mirror, a standard mirror with a reflective material located on the front surface 524 of the mirror can also be used.

The mirror platform 500 also includes a media display device viewing area 528. The media display device viewing area 528 is formed by an area that has been made non-reflective by selectively removing the backing layer 506 from the glass layer 504. A preferred method for selectively removing the reflective backing includes isolating the area by applying tape, printed ink or a similar item to the back of the standard mirror around the area from which the reflective backing is to be removed. Paint remover or a similar solvent is then applied to the rear surface 526, and paint is removed with a scraping device such as a razor blade.

The area is then washed with water or other suitable material to remove the paint and expose the backing layer 506 of the standard mirror. A sharp instrument is used to define the outer perimeter of the media display device viewing area 528, and an etching solution, such as Ferric chloride (FECl3), printed circuit board etching solution, or a similar material is applied to the exposed backing layer 506. After the solution sits for a suitable length of time, the solution is wiped away, which removes the backing layer 506, leaving only the glass layer 504. In an alternative embodiment, the media display device viewing area 528 is masked off on a piece of glass, and backing layer 506 is added to the glass layer 504.

After the backing layer 506 has been removed, the media display device viewing area 528 is close to 100% transmissive. Accordingly, when the media display device 520 is aligned with the media display device viewing area 528, the light from the media display device is transmitted through the glass layer 504 with minimal loss, making the images on the media display device screen readily visible from the front of the mirror platform 500.

In addition to the media display device viewing area 528, the backing layer 506 can also be removed from locations on the mirror platform 500 corresponding to an indicator light 136 or an infrared sensor 138 (see FIG. 1).

A back lit portion 530 of the mirror platform 500 allows light from a light source 522 located behind the rear surface 526 to pass through to illuminate a portion of the front surface 524 of the mirror platform 500. Back lit portions 530 are at least partially translucent and can be formed using the same processes employed to create the media display device viewing area 528. Alternately, sand blasting, chemical etching, dipping in a chemical bath, or treatment in any other manner previously disclosed, are also within the scope of the present disclosure to form back lit portions. A clear backing film may be added to the back side of the mirror to create safety mirror while at the same time allowing for light and display image to shine through.

Figure 6:
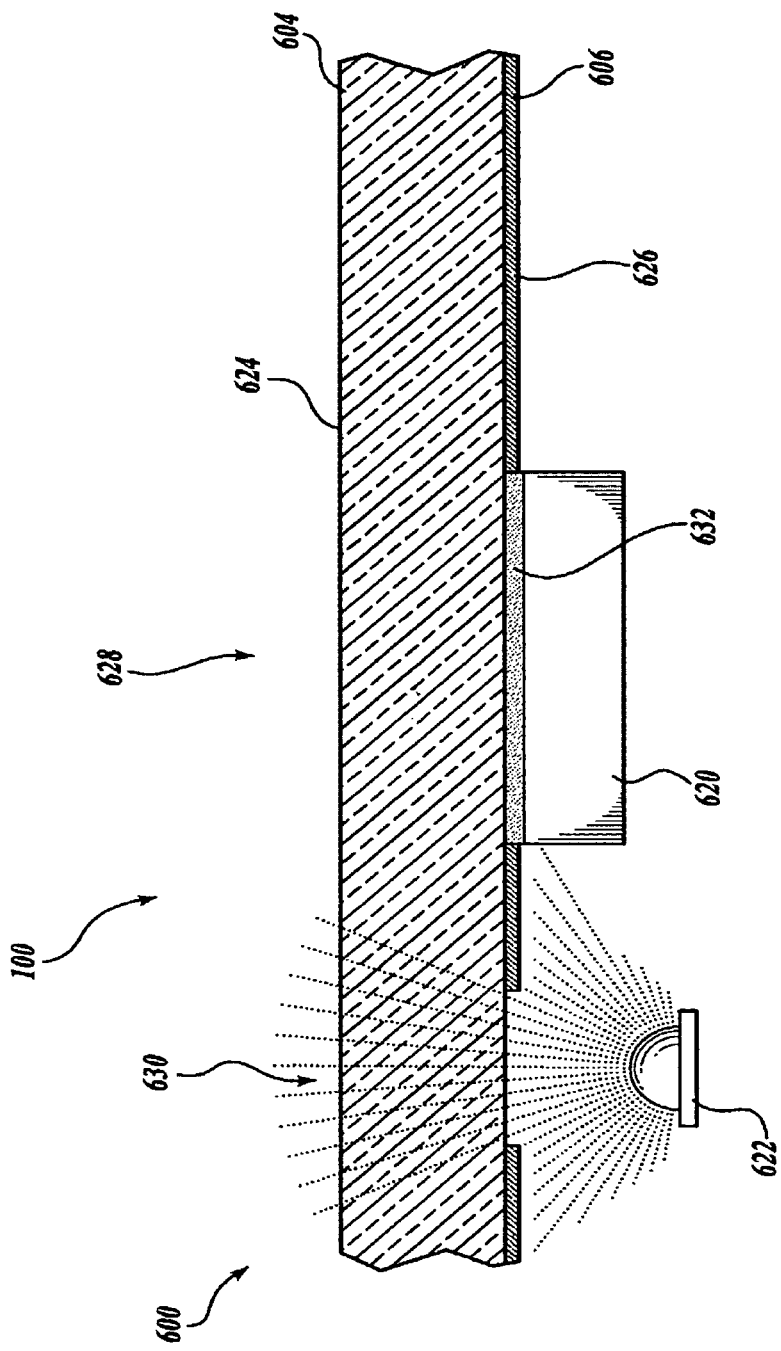
FIG. 6 is a cross-sectional view of a mirror/media display device assembly constructed in accordance with a third embodiment of the present disclosure.

FIG. 6 illustrates a mirror/media display device assembly 100 having a mirror platform 600 constructed in accordance with yet another embodiment of the present disclosure. The mirror platform 600 is substantially identical in construction, material and operation as the mirror platforms described above with the following exceptions.

The mirror platform 600 includes a glass layer 604 and a reflective layer 606. The reflective layer 606 is selectively removed from the rear surface 626 of the mirror platform 600 to form a media display device viewing area 628. Light emitted from the media display device 620 passes through the front surface 624 of the glass layer 604, making the images from the media display device 620 visible from the front surface of the mirror platform 600.

The mirror platform 600 also includes a polarized film 632. The polarized film 632 is disposed between the media display device 620 and the glass layer 604. The media display device 620 emits polarized light, approximately 100% of which is selectively allowed to pass through the polarized film 632. One example of suitable media display device is an LCD media display device, which is known to emit polarized light. The light passes through the polarized film 632 and the glass layer 604, allowing the media display device images to be viewed from the front of the mirror platform 600.

The polarized film 632 is reflective when the media display device is off, resulting in an increased reflectivity in the media display device viewing area. As a result, the media display device viewing area 628 of the mirror platform 600 blends into the surrounding mirror, making it less noticeable when the media display device is in an "off" state.

The polarized film 632 is preferably attached directly to the glass layer 604 of the mirror platform 600. Attaching the polarized film 632 in this manner places the film in substantially the same plane as the backing layer 606, thereby minimizing the difference between the appearance of the standard mirror portion and the media display device viewing portion. Alternately, the polarized film 632 can be mounted on a separate piece of glass, which is then disposed between the media display device 620 and the glass layer 604. As an alternative to the polarized film 632, a transmissive mirror may be used.

The mirror platform 600 may also include one or more back lit portions 630. The back lit portions 630 are at least partially translucent and can be formed using any previously disclosed method suitable for forming the back lit portions 530.

Figure 7:
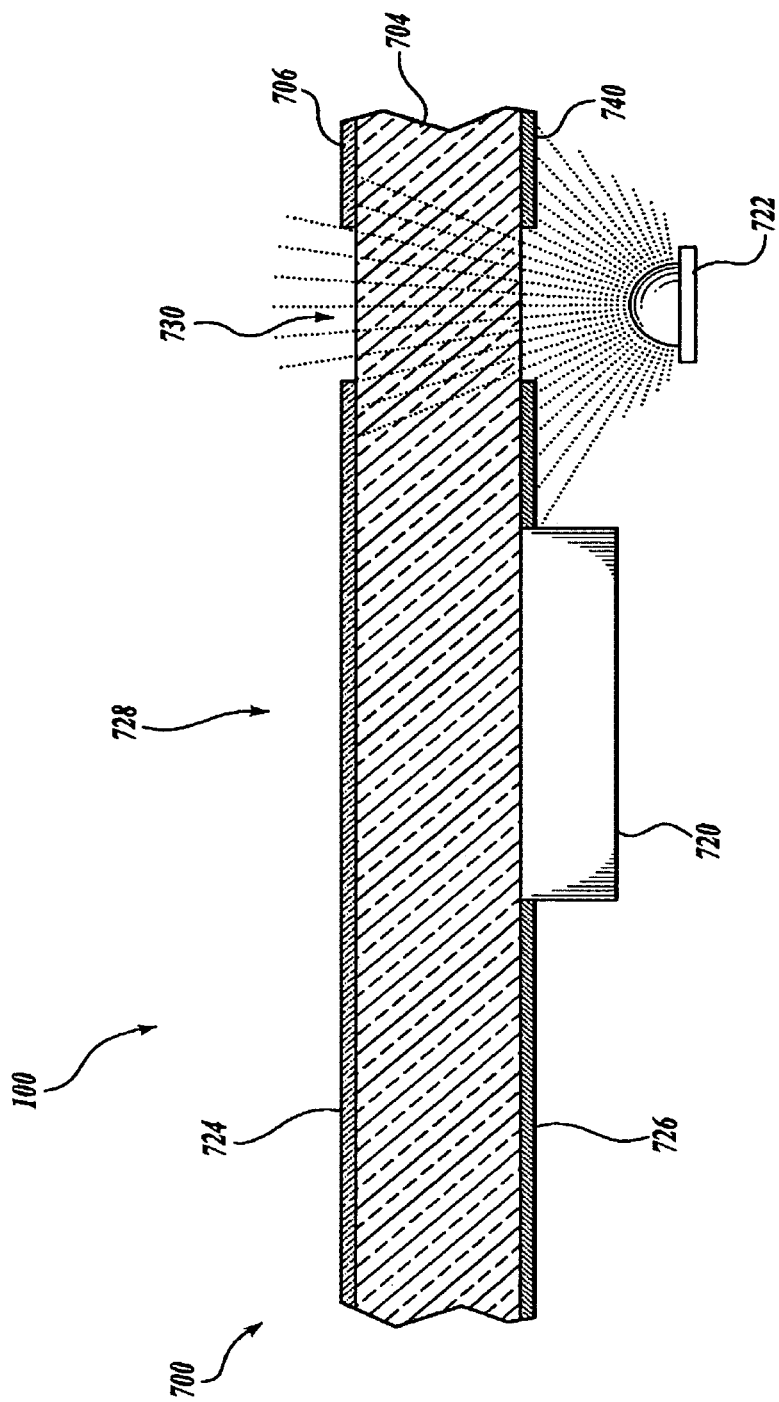
FIG. 7 is a cross-sectional view of a mirror/media display device assembly constructed in accordance with a fourth embodiment of the present disclosure.

FIG. 7 illustrates a mirror/media display device assembly 100 having a mirror platform 700 constructed in accordance with still yet another embodiment of the present disclosure. The mirror platform [700] is substantially identical in construction, material and operation as the mirror platforms described above with the following exceptions.

The mirror platform 700 includes a glass layer 704 and a reflective layer 706. The mirror platform 700 also includes a front surface 724 and a rear surface 726. The reflective layer 706, which is not completely opaque, is affixed to one or both sides of the glass layer 704. The reflective layer 706 gives the mirror platform 700 a high reflectivity. In addition, the reflective coating imparts a low transmissivity, typically in the range of about 10% to about 25%.

The media display device 720 is a high brightness media display device, having a brightness in the range of about 500 to about 2000 nits. The low transmissivity of the mirror platform 700 prevents transmission of about 75% to 90% of the light emitted from the media display device 720. The remaining 10% to 25% of the emitted light passes through the glass layer 704 and can be viewed from the front of the mirror platform 700. Standard media display devices typically operate in a range of about 300 to 500 nits of brightness. Accordingly the brightness of the media display device 720 and the transmissivity of the mirror platform 700 can be chosen to provide a desired image brightness.

For example, a transparent mirror with a transmissivity of [25]% can be paired with a media display device having about 2000 nits of brightness, resulting in an image viewed from the front side of the mirror platform 700 with a brightness of about 500 nits. The operating environment can also influence the selection of the transmissivity of the transparent mirror and the brightness of the media display device.

The quality of the reflection from the mirror platform 700 can be improved by applying a backing layer 740 to the rear surface 726 in locations other than the media display device viewing area 728 or a back lit portion 730. The backing layer 740 is preferably black, and may also act as a safety backing, and reduces the transmissivity of the mirror, thereby improving the quality of the reflection in those areas of the mirror to which the black backing is applied. Further, the media display device 720 has a generally black screen when turned off, increasing the reflectiveness of the mirror in the media display device viewing area 728. As a result, the quality of the reflection in the media display device viewing area is improved when the media display device is in a "off" state.

The mirror platform 700 may also include one or more back lit portions 730. The back lit portion 730 is formed by selectively removing the reflective layer 706 from the glass layer 704. Sandblasting is preferably used, but any suitable method can be used, including chemical etching, chemical bath, or abrasion. The back lit portions 730 are at least partially translucent and allow more light to pass through than do the portions of the mirror platform 700 from which the reflective coating has not been selectively removed. As a result, light from a light source 722 located behind the mirror platform 700 passes through the glass layer 704, illuminating the back lit portion 730.

Figure 9:
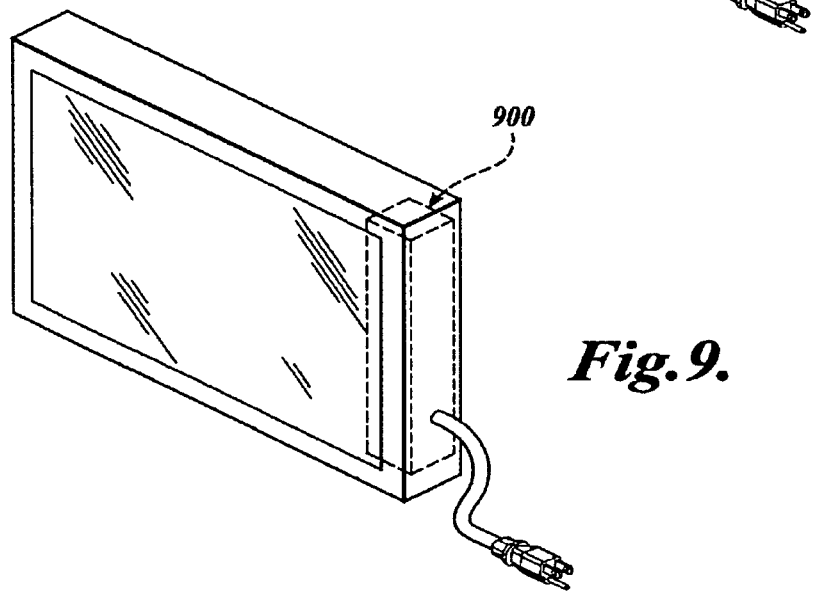
FIG. 9 is an isometric view of the media display device of a mirror/media display device assembly, showing the media display device having power adapter constructed in accordance with one embodiment of the present disclosure.
Figure 10A:
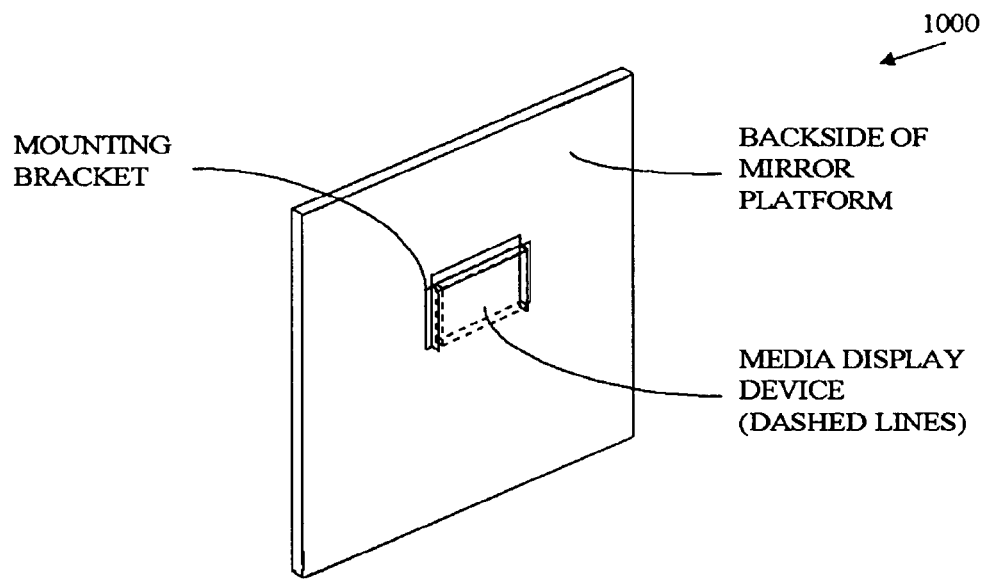
FIG. 10A is an isometric view at 1000 and 1050 of a back side of a mirror platform according to embodiments of the invention.
Figure 10A:
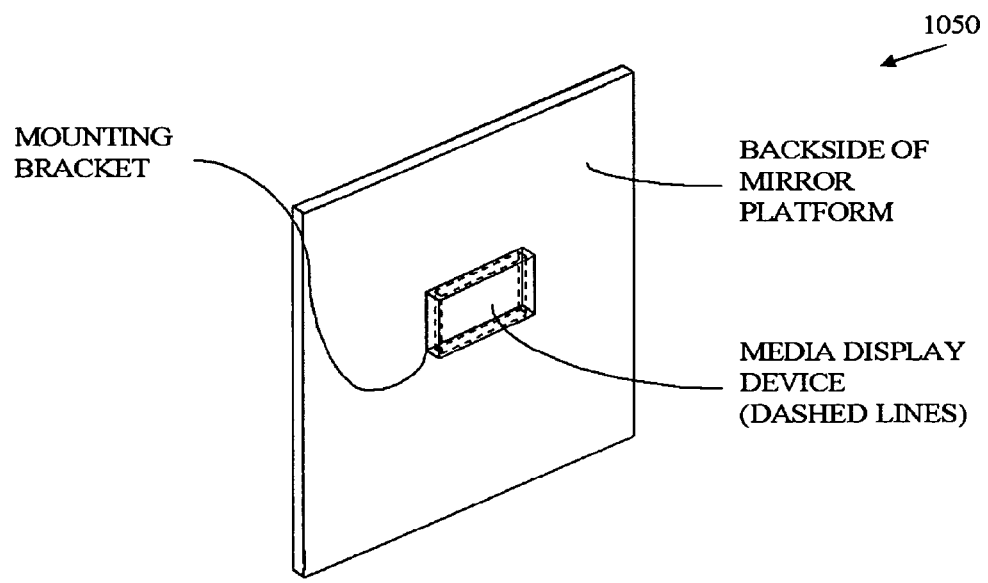
Figure 10B:
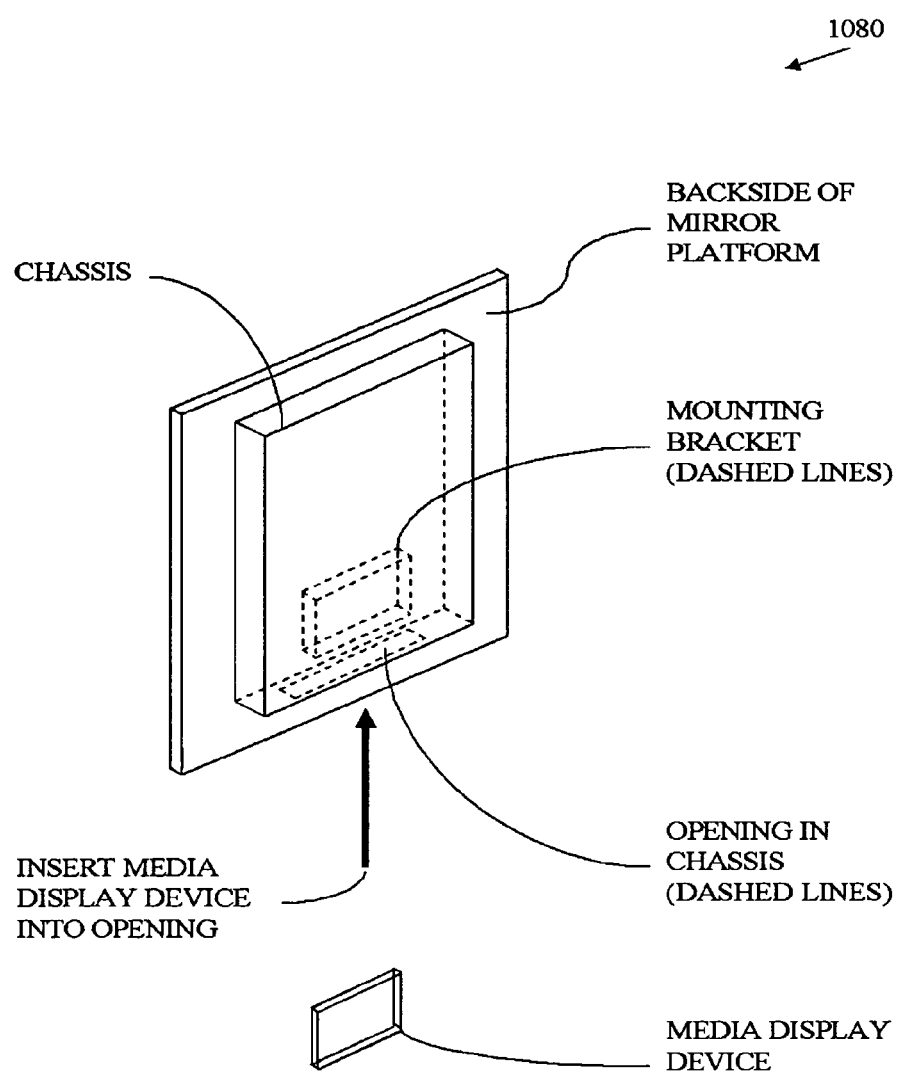
FIG. 10B is an isometric view at 1080 of a back side of a mirror platform illustrating an opening in a chassis according to one embodiment of the invention.

As may be best seen by referring to FIG. 9, it is preferred that the media display device 120 has a thin profile, such as about one inch or less. Such a thin profile minimizes the distance that the mirror/media display device assembly 100 extends from a wall to which it is mounted. In general, the overall thickness of the mirror/media display device assembly 100 is less than about two and one-quarter inches and, in some embodiments, as thin as one and one-quarter inches, or less.

To assist in achieving the desired thin profile, the media display device 120 is configured so that audio and visual connection components (such as the audio wire, RF cable, S-video cable, power cable) come directly out the top or in some cases, the bottom of the housing of the media display device 120 rather than from the rear of the media display device 120. To further decrease the space required to house the media display device 120, the disclosed media display device has an integral, low-profile power adapter 900 that fits within the thin (e.g., one inch) media display device housing.

Figure 8:
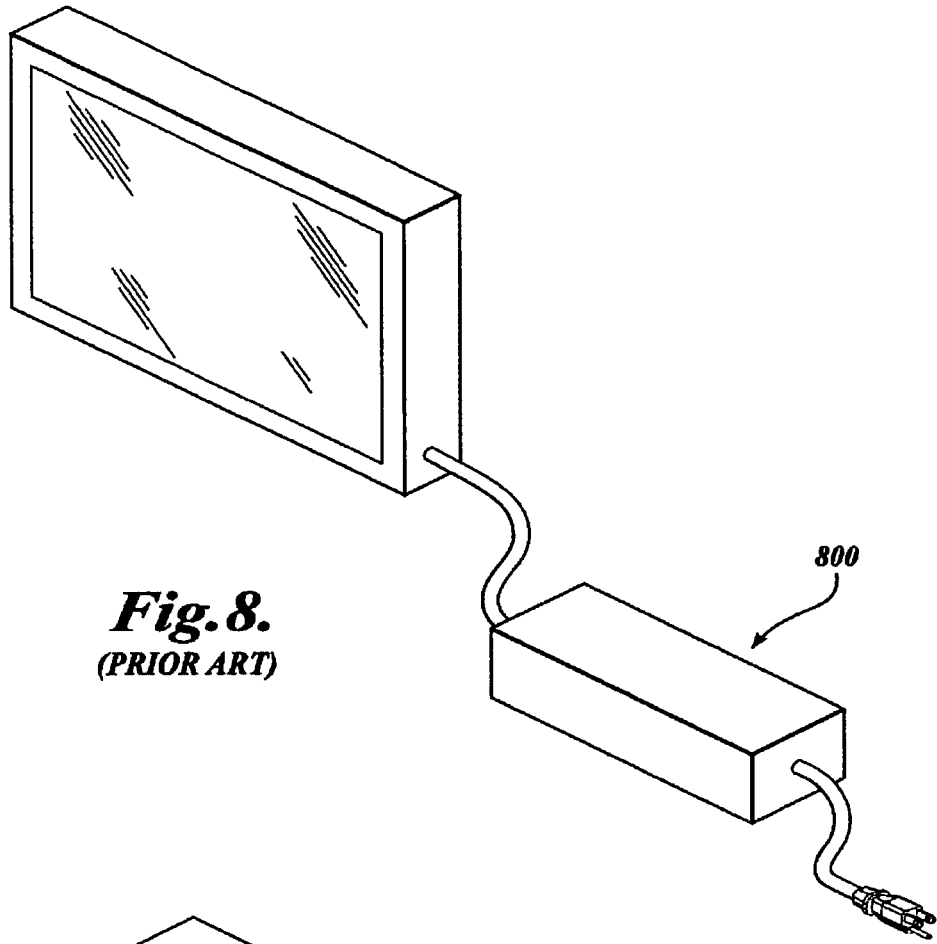
FIG. 8 is an isometric view of a previously known media display device with an external power adapter.

As illustrated in FIG. 8, known media display device units that are less than two inches in thickness have large, external power adapters 800 that take up considerable space. The added thickness of the power adapter 800 often requires a wall recess behind the mirror/media display device assembly. FIG. 9 illustrates an integral, low-profile power adapter 900 constructed in accordance with one embodiment of the present disclosure.

The power adapter 900 is contained in the housing of a media display device 120. One example of a suitable low-profile power adapter is Model No. TR36A-12, manufactured by Cincon Electronics Co. LTD. Making the low-profile power adapter 900 integral to the media display device also simplifies assembly by reducing the number of parts to be assembled.

While illustrative embodiments have been illustrated and described, it will be appreciated that various changes can be made therein without departing from the spirit and scope of the invention.

What is claimed is:

1. A method comprising:
   selecting a reflectivity of a reflective area, the reflective area is part of a mirror platform;
   selecting a reflectivity of a media display device viewing area, the media display device viewing area is another part of the mirror platform; such that when a media display device is placed behind the media display device viewing area and the media display device is in an off state, a reflectivity of the media display device viewing area is substantially the same as the reflectivity of the reflective area which causes the media display device viewing area to blend into the reflective area without any polarizing layer within the media display device viewing area; and
   defining a back lit portion of the mirror platform, wherein a reflectivity of a portion of the mirror platform is reduced to obtain the back lit portion; such that light from a light source located behind the mirror platform passes through the backlight area when the light source is on.

2. The method of claim 1, wherein the back lit portion and the media display device viewing area are separated by reflective area of the mirror platform.

3. An apparatus comprising:
   a mirror platform having a back lit area, a media display device viewing area and a reflective area, wherein a reflectivity of the media display device viewing area is less than a reflectivity of the reflective area; and
   a media display device coupled to the mirror platform and positioned to display images through the media display device viewing area, wherein the media display device modifies a reflectivity of the media display device viewing area such that a reflectivity of the reflective area is substantially the same as a reflectivity of the media display device viewing area when the media display device is in an off state, which causes the media display device viewing area to blend into the reflective area without any polarizing layer within the media display device viewing area.

4. A mirror platform, comprising;
   a glass layer, the glass layer further comprising:
   a glass layer front surface and a glass layer rear surface;
   a media display device viewing area;
   a reflective area;
   a first layer applied to the reflective area of at least one of the glass layer front surface and the glass layer rear surface, wherein the first layer is both reflective and transmissive, wherein a media display device modifies a reflectivity of the media display device viewing area such that a reflectivity of the reflective area is substantially the same as a reflectivity of the media display device viewing area when the media display device is placed behind the media display device viewing area and the media display device is in the off state and no polarizing layer is in the media display device viewing area; and a backlit portion, the back lit portion is created by removing a portion of the first layer from the reflective area.

5. The mirror platform of claim 4, wherein the first layer is applied to the media display device viewing area.

6. The mirror platform of claim 5, further comprising:
a second layer applied to the reflective area of the glass layer rear surface, wherein the second layer increases a reflectivity of the first layer.

7. The mirror platform of claim 4, further comprising:
a light source, the light source is located proximate to the glass layer rear surface, and creates two operating states, in the first operating state when the light source is "on" a portion of light from the light source illuminates the back lit portion; in the second state when the light source is "off" the back lit portion has the reflectivity of the reflective area.

8. The mirror platform of claim 4, further comprising:
a backing layer, the backing layer is applied a rear side of the mirror platform to provide a safety mirror while still allowing light pass through the glass layer.

9. The mirror platform of claim 4, wherein removing a portion is accomplished by a process selected from the group consisting of sand blasting, chemical etching, dipping in a chemical bath, acid etch, acid dip, and a process that decreases the reflectivity of the back lit portion relative to the reflective area.

10. A method comprising:
selecting a reflectivity of a reflective area, the reflective area is part of a mirror platform;
selecting a reflectivity of a media display device viewing area, the media display device viewing area is another part of the mirror platform; such that when a media display device is placed behind the media display deice viewing area and the media display device is in an off state, a reflectivity of the media display device viewing area is substantially the same as the reflectivity of the reflective area which causes the media display device viewing area to blend into the reflective area without any polarizing layer within the media display device viewing area; and
creating a back lit portion of the mirror platform, wherein a reflectivity of the back lit portion is reduced relative to a reflectivity of the reflective area; such that light from a light source located behind the mirror platform passes through the back lit portion when the light source is on.

11. The method of claim 10, wherein the back lit portion and the media display device viewing area are separated by reflective area of the mirror platform.

12. The method of claim 10, wherein the creating a back lit portion is accomplished by a process selected from the group consisting of sand blasting, chemical etching, dipping in a chemical bath, acid etch, acid dip, and a process that decreases the reflectivity of the back lit portion relative to the reflective area.

* * * * *